Feb. 18, 1936.                J. A. ZUBLIN                 2,031,088
                    METHOD AND APPARATUS FOR FUSING METALS
                            Filed Aug. 6, 1934
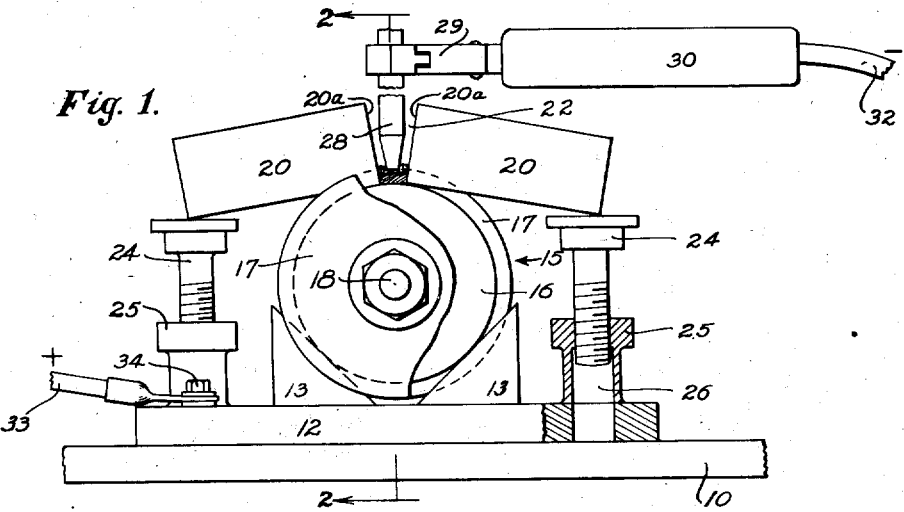
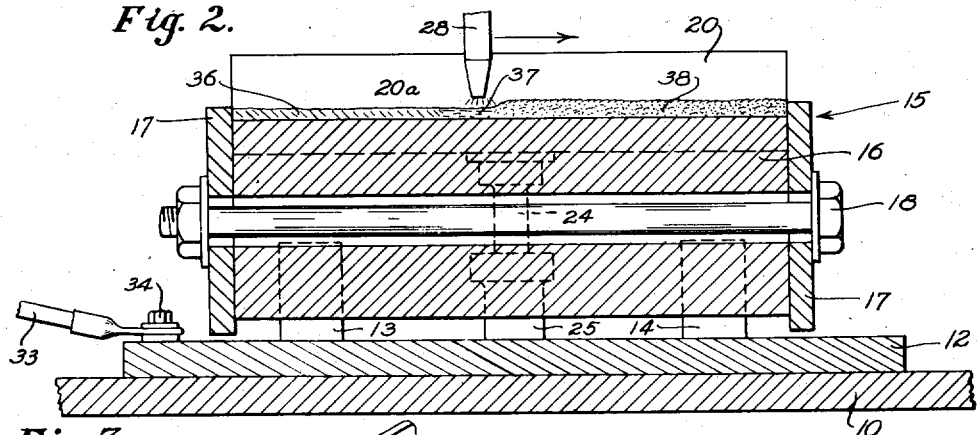
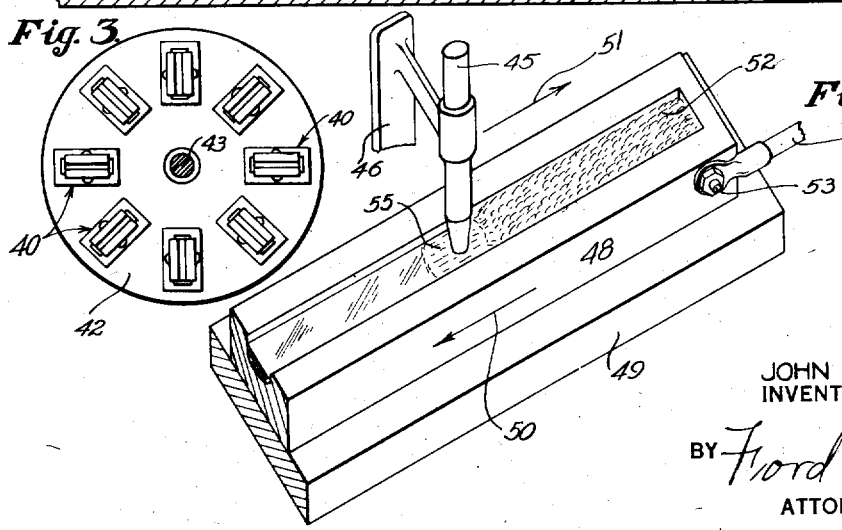
JOHN A. ZUBLIN
INVENTOR
BY Ford W. Harris
ATTORNEY Patented Feb. 18, 1936

2,031,088

UNITED STATES PATENT OFFICE 2,031,088

METHOD AND APPARATUS FOR FUSING METALS

John A. Zublin, Bel Air, Calif.

Application August 6, 1934, Serial No. 738,684

5 Claims. (Cl. 75—22.5)

The present invention has to do with methods and apparatus for fusing metals to produce a relatively uniform body from constituents that do not readily mix or dissolve one in another. As a specific example of the invention, there is shown apparatus adapted to making alloy welding rods, since the apparatus has been developed with this end in view; but it is to be understood that the invention in its broader aspects is not limited to this specific device or this particular use, for it may be embodied in devices adapted to other uses.

It has been common practice to melt metals to effect a solution or mixing of them while in the liquid state, but such practice is not adapted to those metals which do not mix when liquid, such as iron and copper which are very sparingly soluble in each other and, at certain temperatures, immiscible. Another example is lead and zinc. When these first two metals are subjected to the conventional methods of melting in a crucible and then pouring into a mould, there is necessarily sufficient elapsed time for the metals to separate, and the casting contains the undissolved copper in a few large segregations that result in a decidedly non-uniform product.

I have found, however, that if the constituents, after being intimately mixed, are melted and subsequently cooled so rapidly that separation cannot occur, the resulting product is substantially uniform and contains the elements in quantities in excess of the amounts that can be mutually dissolved. The total time involved is very short so that the metals are not fluid long enough to separate; also losses by oxidation and vaporization are kept low by reducing the duration of exposure to high temperatures.

The invention has as its general object the fusing together of metals which do not easily mix or dissolve in one another and the congealing of these fused metals to form a solid unitary body of substantially uniform composition and distribution of the constituent metals, the metals being present in excess of quantities that can be dissolved.

A second object is a method of obtaining a uniform distribution of the constituents when the molten state is reached, and of cooling the melt to a stable condition before the distribution of the metals has become non-uniform because of separation of one constituent into a few large bodies.

Another object of the invention is to provide means in which the metals may be fused but which also has mould characteristics so that there is no time required for the transfer of the molten material from a crucible to a mould.

Another object is to provide method and apparatus which are not critical in their operations as regards the state of division or the particle size of the charge to be melted, but which can be operated successfully with a finely powdered charge or with one comprising relatively large particles, or with a mixture of large and small grains.

A further object is to provide a device with which the quantity, intensity, and duration of heating can be readily controlled according to the quantity and physical characteristics of the charge to be melted, in order to secure proper rate of melting, time of liquification, and temperature of melting, and in which the heat can be locally concentrated to effect fusion of substances of high melting point.

These objects are attained in an apparatus embodying my invention, that comprises a mould, in the shape of the final product, adapted to receive the charge of mixed metals. At least one wall of the mould is an electrical conductor or electrode, and a second electrode is adapted for movement into arcing relation with the mould electrode so that the arc between them passes through the substance to be fused, the two electrodes being capable of relative movement so that the arc may be moved on away from the molten charge to progressively fuse the remainder of the charge.

The final product contains the undissolved excess of a metal in small particles dispersed throughout the remainder of the metals, similar to being embedded in a matrix. In this respect the product is similar to a sintered product, but the process is more nearly true melting since all constituents will normally melt at the temperatures available, except possibly in case a difficultly fusible substance such as tungsten carbide is used with a metal of much lower melting point and it is not necessary or desirable to fully melt the constituent of highest fusion point. The composition and character of a typical product are described more fully in my companion application entitled "Alloy and method of making same", Serial No. 738,683, filed on even date herewith, and which may be referred to for further description of the physical characteristics of a typical product.

How these and other objects and advantages of my invention are attained will be more easily understood from the following description of a preferred and typical form of apparatus, and the annexed drawing, in which:

Fig. 1 is an end view, with portions broken away, of a device constructed in accord with my invention;

Fig. 2 is a longitudinal vertical section on line 2—2 of Fig. 1;

Fig. 3 is a diagrammatic plan of a revolving table carrying a plurality of the units illustrated in Fig. 1; and Fig. 4 is a diagrammatic perspective of a variational form of apparatus.

Inasmuch as a thorough understanding of the method of operating one particular apparatus will illustrate the general principles of my invention, I show and describe a preferred form of apparatus particularly suited to the formation of special alloy welding rod, because the apparatus has been developed with this end in mind and because it illustrates the many advantages of the invention; but such disclosure is not to be construed as limitative upon the method or physical means used to carry out the method.

Referring now to Fig. 1, a table or any suitable supporting means is indicated at 10 upon which rests base plate 12 of a mould unit. Attached to the base plate in any suitable way is a plurality of triangular blocks arranged in opposed pairs 13 and 14 so that the upper oppositely inclined faces of the pairs present a general V-formation upon which rests the cylindrical electrode generally indicated at 15. The electrode assembly 15 comprises a central cylindrical member 16 and a pair of discs 17 carried one at each end of cylinder 16 and held in place by bolt 18 as illustrated in Fig. 2. If desired, discs 17 can be formed integrally with cylinder 16 as terminal flanges.

A pair of bricks 20 are so placed that their inner longitudinal edges rest upon the top of cylinder 16 and present opposed faces 20a spaced a short distance apart. The bricks are of the same length as cylinder 16 and fit in between discs 17. In this way, the bricks and electrode assembly 15 form an elongated mould or charge receiving space 22 on top of cylinder 16, of which mould, faces 20a form the side walls, cylinder 16 forms the bottom wall, and discs 17 form the end walls. Since the charge is melted while in space 22, this space is in the nature of a combined crucible and mould to shape the final product. The outer edges of the bricks are supported by posts 24 threaded into standards 25 secured to base 12. Base 12 and the lower portions of standards 25 are counter-bored as at 26 to receive posts 24 so that the latter may be adjusted vertically by simple rotation to properly position bricks 20. In this way the bricks may be suitably adjusted to any size of cylinder 16, and the bricks may be moved toward or away from each other to alter the size and shape of space 22 so that the mould formed thereby will be of the desired shape.

For reasons that will be more evident, it is preferred that cylinder 16 be of electrically conductive material, and for this purpose carbon is preferred since it has a relatively high melting point. Bricks 20 may be of any suitable material, and it is preferred that they be of electrically non-conductive material since during the application of the electric arc, to be described later, the arc is likely to short across to the bricks rather than pass through the charge in space 22 and then to electrode 15. As it is sufficient that only one wall of the mould be an electrode, the bricks are preferably of some refractory material which is not likely to combine with the materials that are fused.

Although the electrode 15 may have a cross section other than circular, a generally circular cross section is preferred because, after the surface of cylinder 16 has become rough and pitted from use, a selected new surface may be brought into the top position to act as the mould wall by simply rotating the entire electrode, and, being circular, it will rest on blocks 13 and 14 equally well in any position. Furthermore, the periphery of cylinder 16 may be provided with indentations or other configurations designed to shape the final product, and when the electrode is circular or approximately so it is easily possible to bring selected portions of the electrode into operative position by rotatably adjusting it on its supports.

A movable electrode is provided in the form of carbon pencil 28 held in clamp 29 on handle 30 so that it may be grasped by an operator and moved lengthwise of mould 22. Electrode 28 is an ordinary carbon pencil of relatively small area as compared with the total area of space 22 so that the arc passing between the two electrodes is concentrated in a small space and the total heat of the electric current is localized. As will be understood, it is not necessary that this upper electrode be manually movable, for mechanical control means may be used. Or the pencil may be stationary and the lower electrode movable since any arrangement which secures relative movement between the two electrodes will provide an arc which moves along the entire mould.

The electrical power is direct current supplied from any suitable source by negative lead 32 attached to electrode 28 and positive lead 33 attached to binding post 34 on base plate 12, the current passing to electrode 15 through wedges 13 and 14.

The present process is not limited to a specific composition of material, any suitable substances being placed in mould 22. For making my alloy welding rods, I prefer to use a composition comprising copper mixed with a ferrous base which may be iron and/or various ferro-alloys such as ferro-chromium, ferro-molybdenum, and the like, the copper being present in amounts greatly in excess of the amount soluble in the ferrous base. A typical composition is shown by the following table showing the range in parts by weight of the constituents:

| | Range |
|---|---|
| Ferro-molybdenum | 9.25–11.25 |
| Ferro-chromium | 10.0 –12.5 |
| Ferro-manganese (optional) | .5 – 1.5 |
| Cast iron | 11.0 –16.0 |
| Copper | 12.0 –12.5 |
| Flux | None– 1.0 |

The alloy produced is described in my said copending application Ser. No. 738,683.

However, it has been found preferable to comminute the metals to a granular form in which the grains are, preferably, generally uniform in size and about as large as will pass through a 20-mesh screen. This grain size is selected to help obtain a closely uniform product, and is not limitative upon the charge used, for the device has been operated successfully with particles as large in cross section as the final rod, and also with a mixture of large and small particles. The charge may also comprise one or more wires or rods laid lengthwise of space 22 to be melted into the final product, thus indicating the device operates equally well over a range of sizes or with mixed sizes of particles in the charge.

In making welding rod, better rod is obtained with a more uniform composition. It is not essential that each fraction of a cross section have the same identical composition, but what is sought is to have each short length of the rod of substantially the same average composition. This is done by uniformly distributing the particles of each constituent through the charge by some mixing device, a preferred one being a ball mill because of the uniformly fine distribution obtained. Of course the finer particle sizes lend themselves to a better distribution, and help in maintaining a uniform quality of product.

After suitable mixing of the constituents, a proper amount of the mixture is introduced into the mould. With electrode 28, an arc is then struck at one end of the mould, the current passing through the mixture to electrode 15. The intense heat of the arc rapidly melts the powdered materials beneath pencil 28 and surrounding the arc passing through the mixture, and as rapidly as a portion of the material melts in one spot the arc is moved away from the molten charge and over unmelted charge so that the entire charge is progressively melted from one end to the other. The masses of bricks 20 and electrode 15 are relatively large and are not appreciably heated during the short exposure to the arc. Consequently the heat flows rapidly out of the fused substance into the cooler mould walls where it is dissipated. In this way the fused substance is quickly congealed and chilled to relatively low temperature. Thus there are in the mould at the same time three stages of the product; the congealed solid 36 behind the electrode, the fused substance 37 beneath the electrode, and unmelted mixture 38 ahead which is being progressively exposed to the arc.

Rapid cooling of the charge immediately following the fusion is made possible by progressively exposing the unmelted charge directly to the arc, for in this way the previously melted material is not used to transmit heat to charge as yet unmelted, as is the case in conventional furnaces and crucibles. In the short time that the liquid state is maintained, constituents which readily mix and dissolve in one another will become thoroughly intermingled, but if the liquid state is maintained for any appreciable time, those constituents (e. g. copper) which do not mix readily will tend to separate from the remainder of the metals and will form large aggregations causing a non-uniformity in the final product. By quickly moving the arc away from any point just as fusion occurs, and then quickly chilling the fused substance, the metals freeze while still uniformly intermingled and before segregation takes place, thus resulting in a relatively uniform final structure. Furthermore, the total duration of exposure at high temperatures has been reduced to a minimum so that loss of elements from oxidation or vaporization will also be held to a minimum.

For the melting operation, there is used very intense localized heat. The electric arc is preferred to the acetylene torch because there is no blast of gas to blow away the powder and it is possible to get a greater intensity of heat. As an example, good results have been obtained with currents of 400–600 amperes at a potential of 30 volts. The arc temperature is in the neighborhood of 3,000 degrees centrigrade, which is well above the melting point, or in many instances even the boiling point, of most substances which may be fused in the mould. This current provides an arc having such a large quantity of heat as to almost instantaneously melt the mixture, regardless of variations in the size or melting point of the individual particles. The combination of high temperature and high heat output make negligible the difference in time of melting between large and small pieces, or ones with high and low melting points.

In practice, the electrode can be moved substantially continuously along the mould. When electrode 28 is hand operated, the rate of movement may not be uniform, or the operator may temporarily move the electrode backwards, but in general its movement may be characterized as being continuously forward, away from the molten portion of the charge, to progressively expose unmelted portions of the charge to the arc. The rate of movement will depend on the energy output of the arc, the mass of charge per unit length of the mould, and, to some extent, the fusibility of the charge. For example, other factors remaining constant, the electrode speed will vary with the spacing of faces 20a as that controls the size of rod produced and hence the weight of charge per inch to be melted. By proper regulation of these inter-related factors, control is exercised over the rate of melting, the time of liquification, and the temperature of the melt.

The amount of oxidation will depend upon exposure to the atmosphere and the amount and duration of high temperatures. Since the time of melting, the time of liquification, and the time of congealing are all as short as possible, the total time during which the substance is at a sufficiently high temperature to oxidize is very short and little oxidation takes place. The amount of oxidation may be further reduced by preventing contact with the atmosphere through the presence of a neutral or reducing layer of gas over the fused body. This gas may be introduced as such by suitable means, or by vaporizing electrode 28, or by the vaporization of constituents in the mixture to be fused. In practice, the tip of electrode 28 burns away slowly, and so there is present over the charge an atmosphere containing carbon vapor or carbon monoxide which results in a more or less neutral atmosphere. By using a special electrode this effect can be increased.

After a thorough mixing of the dry ingredients that will form the charge, it is preferable, but not necessary, to add to the mixture about 1% by weight of some combustible liquid that is not too volatile and is chemically inert relative to the powdered materials. Addition of such a liquid has been found to prevent segregation of the dry particles as the mixture is stirred and handled and so results in a mixture that is at all times more nearly uniform. Moistening the mixture is especially helpful in maintaining uniformity when the mixture contains flaky particles.

The moistening liquid is preferably combustible for it then has the effect of reducing oxidation since it burns in the arc and forms a layer of neutral products of combustion over the fused material. A combustible hydro-carbon, for example kerosene or turpentine, is particularly suitable since it consumes the oxygen in the atmosphere immediately around the arc and does not add any oxygen to the mixture.

The condition may arise where one or more constituents of the charge are difficultly fusible, such as tungsten carbide. Or one constituent may have a very low melting point. Under these circumstances it may be desired to melt less than all, or only one, of the constituents. This can be done by decreasing the current and consequently the heat output, or by moving the upper electrode more rapidly, or both. Thus the broader aspects of the invention include the formation of a solid body by fusing one or more ingredients of a mixture and rapidly cooling the fused substance before separation of the other unmelted ingredients takes place, so that a relatively uniform solid free from large segregations is produced.

The electric energy is used very efficiently for radiation losses are small, the time during which the metal is maintained liquid is short, and there is no large mass of furnace, crucible, or mould to heat. As a result, nearly all the heat supplied is used to melt the charge.

Fig. 3 illustrates a device in which a plurality of mould units such as have been already described are placed upon a movable support so that they may be successively moved past a given point. It has been found advantageous to mount a plurality of these units 40 on a central table 42 which rotates about a vertical spindle 43. In this case, the operator uses a single movable electrode 28 but is stationed at one place so that the electrode has only a predetermined range of movement. By rotating table 42, successive mould units may be placed in front of him within easy reach and when the fusing operation has been completed in each unit it may then be moved on to a successive point where a second operator can remove the finished welding rod and prepare the mould to receive another charge of mixture. Obviously, these mould units need not be placed upon a circular table but may be placed upon any suitable moving member which will pass them before a particular point; and the movable electrode may be machine operated to move only longitudinally of the mould, after the mould has been moved into position beneath the electrode.

Fig. 4 illustrates diagrammatically a variational form of apparatus. In this form, the upper electrode 45 is mounted in a stationary bracket 46 so that it is fixed in position. The mould is formed by a cavity in a block of carbon 48 which rests upon a moving member 49 adapted to pass block 48 past electrode 45 so that the cavity therein moves longitudinally relative to the upper electrode. In this construction, all the mould walls are formed by an electrode which happens to be the movable one.

Obviously, the cavity in block 48 forming the mould or material receiving space may be of any suitable shape or configuration according to the shape of the final product. Also, the shape of both electrodes and the nature of the relative movement between them may be changed to conform suitably to moulds having shapes other than herein illustrated.

In the event that it is desired to preheat the mixture, this may be done by so attaching the power connection to the mould electrode that the current will pass through the unfused substance before the electrode is actually over it. For example, in Fig. 4 the lower electrode is moving toward the left as indicated by arrow 50 so that the relative movement of stationary electrode 45 is toward the right as indicated by arrow 51, and to preheat powdered material 52 power connection 53 is attached at 53 to the right hand end of the mould which is at a point removed from the upper electrode in the direction of the latter's movement relative to the mould.

The smaller the cross section of the lower electrode the greater the heating effect will be, since the resistance, and consequently the temperature, of the electrode is inversely proportional to its cross sectional area. Under some circumstances it may be desired to prevent quick chilling by post-heating the molten charge 55; and this can be accomplished either by reversing the relative direction of movement of electrodes 45 and 48 or by attaching the power connection to the opposite or left hand end of electrode 48, so that the electric lead to the lower electrode is at a point removed from the upper electrode in the direction opposite to the latter's movement relative to the mould.

Having described the improved method and preferred forms of apparatus embodying my invention, it will be realized that the disclosure of the drawings and specification is to be considered as illustrative of rather than restrictive upon the broader claims appended hereto, for various changes may be made by those skilled in the art without departing from the spirit and scope of my invention.

I claim as my invention:

1. The process of forming a substantially homogeneous solid body of constituents slightly soluble in each other and present in amounts greatly in excess of their mutual solubility, that includes forming an intimate and uniform mixture of the constituents, placing the mixture in a cool mould, progressively moving over and through the mixture an electric arc which rapidly melts entirely that small portion of the mixture surrounding the arc, but without materially heating the mould, and immediately chilling this small molten portion in the cool mould as soon as the arc moves on, thus solidifying this small molten portion with all of its constituents in substantially the same uniform distribution as in the initial mixture.

2. The process of forming an alloy of metals which are only slightly soluble in each other and are present in amounts greatly in excess of their mutual solubility, that includes forming an intimate and uniform mixture of the constituent metals, placing the mixture in a cool mould, progressively moving over and through the mixture an electric arc which rapidly melts entirely that small portion of the mixture surrounding the arc, but without materially heating the mould, and immediately chilling this small molten portion in the cool mould as soon as the arc moves on, thus solidifying the small molten portion with all of its constituents in substantially the same uniform distribution as in the initial mixture.

3. The process of forming an alloy of a ferrous base and copper in an amount greatly in excess of the amount soluble in the ferrous base, that includes forming an intimate and uniform mixture of the constituent metals, placing the mixture in an open mould, progressively moving over the mixture an electric arc which rapidly melts to a fluid state a small portion of the mixture, and quickly cooling the small molten portion within the mould while the copper is substantially uniformly distributed and before segregation of the copper takes place.

4. The process of forming an alloy of a ferrous base and copper in an amount greatly in excess of the amount soluble in the ferrous base, that includes forming an intimate and uniform mixture of the constituent metals, placing the mixture on an electrode which forms a mould progressively moving over the mixture a second electrode that forms an arc to the first electrode to melt rapidly a small portion of the mixture, and quickly cooling the small molten portion while still on the electrode with the copper substantially uniformly distributed and before segregation of the copper takes place.

5. The process of forming a ferrous welding rod of an alloy including copper in an amount greatly in excess of the amount soluble in a ferrous base, that includes forming an intimate and uniform mixture of the copper and the ferrous base; placing the mixture in an elongate mould the shape of the final rod; at one end of the mould striking an arc from a single carbon electrode which rapidly melts a portion of the mixture, the arc being of sufficient size to melt the mixture across the full width of the mould; then as soon as all the mixture initially exposed to the arc is melted, moving the arc lengthwise of the mould to progressively melt all the remaining mixture; and rapidly and progressively cooling each molten portion as the electrode moves on so that the rod solidifies and retains the substantially uniform distribution of the copper throughout the rod.

JOHN A. ZUBLIN.